E. & J. STROTHMAN.
Straw Cutter.
No. 84,317.
Patented Nov. 24, 1868.
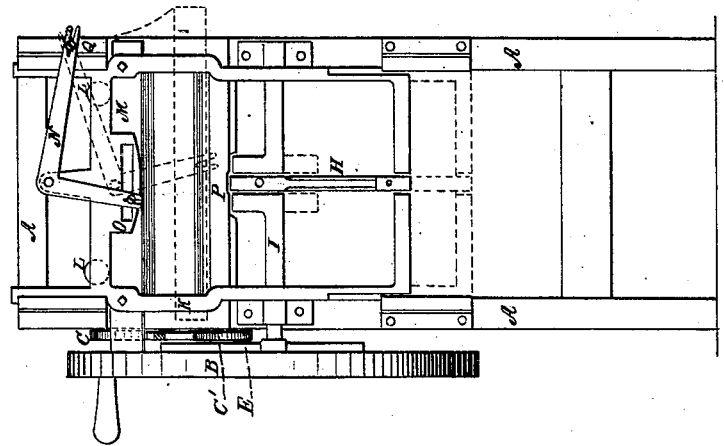
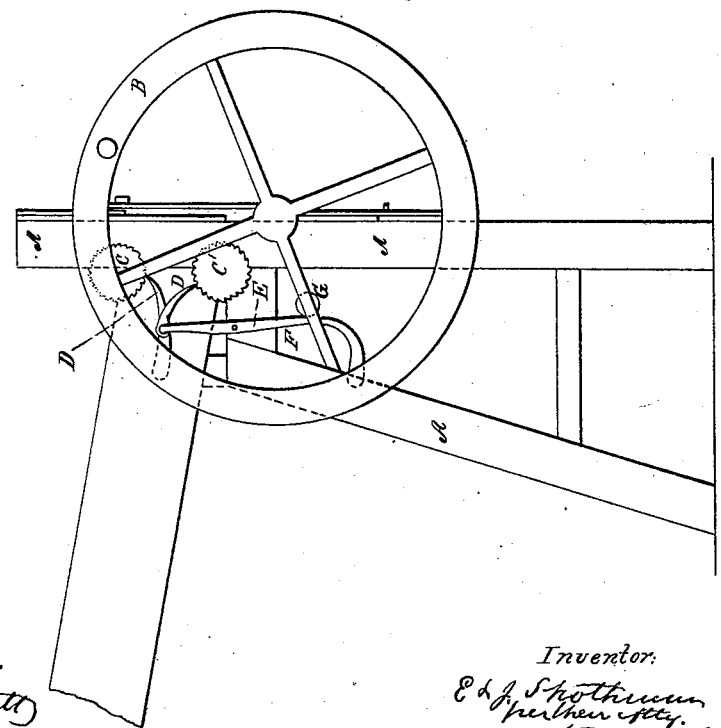

United States Patent Office.

EDWARD STROTHMAN AND JOHN STROTHMAN, OF MILWAUKEE, WISCONSIN.

*Letters Patent No. 84,317, dated November 24, 1868.*

IMPROVEMENT IN STRAW-CUTTERS.

The Schedule referred to in these Letters Patent and making part of the same.

*To all whom it may concern:*

Be it known that we, EDWARD STROTHMAN and JOHN STROTHMAN, of the city and county of Milwaukee, and State of Wisconsin, have invented a new and useful Improvement in Straw-Cutters; and we do hereby declare that the following is a full, clear, and exact description thereof, which will enable those skilled in the art to make and use the same, reference being had to the accompanying drawing, forming part of this specification, in which—

Figure 1 is a side view, and

Figure 2, a front view of our invention.

Similar letters of reference in each of the figures indicate corresponding parts.

The object of our invention is to provide a machine that will cut hay or straw in an easy and efficient manner.

A is the frame.

B, the balance-wheel.

C C', the feed-wheels, attached to the feed-rollers.

D, the feed-hands, which move the feed-wheels.

E, feed-lever.

F, spring, to throw the feed-lever back when it has been thrown forward to perform its work.

G, knob on the fly-wheel, which strikes the feed-lever, and throws it forward at each revolution.

H, pitman.

I, fly-wheel and shaft.

K, frame, which moves the knife.

L L, rollers attached to the knife-frame, bearing upon the back of the knife.

M, knife.

N, lever to move the knife endways.

O, frame, which holds the lever N.

P, iron, which the knife moves against.

Q, stud in the frame, which operates the lever N.

Operation.

Put some hay or straw in the feed-trough and turn the fly-wheel by the pin, and as the wheel turns, knob G strikes the feed-lever and throws it forward, which moves the feed-hands D D, which turns the feed-rollers, which bring the hay or straw forward to the knife, and as as the fly-wheel turns, the knife is given a reciprocating motion, and as it comes down, the lever N gives it a drawing motion, and the hay or straw is cut, as shown by the red dotted lines, fig. 2.

What we claim as our invention, and desire to secure by Letters Patent, is—

1. Pitman H, shaft I, frame K, rollers L L, knife M, lever N, arranged and combined, substantially as described.

2. Wheels C C', hands D, feed-lever E, spring F, and knob G, all combined and arranged substantially as described.

EDWARD STROTHMAN.
JOHN STROTHMAN.

Witnesses:
J. B. SMITH,
H. LUDINGTON.